May 23, 1933. E. V. TAYLOR 1,910,451
BRAKE
Filed April 27, 1931

INVENTOR.
EUGENE V. TAYLOR
BY O. H. Fowler
ATTORNEY.

Patented May 23, 1933

1,910,451

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed April 27, 1931. Serial No. 533,233.

This invention relates to brakes and more particularly to internal expanding brakes.

Broadly, the invention comprehends means for applying the friction elements of an internal expanding brake to the braking surface of a drum with an equal distribution of the applied force.

In the illustrated embodiment, primary and secondary friction elements are movable to engage the braking surface of a drum by a toggle connected between the elements. The toggle is spread by a tension member secured to its knee and extending over a pulley on a fixed support such as a backing plate and through a suitable opening in the backing plate to a source of power, not shown. Pivoted on the backing plate is a lever having its free end positioned between adjacent ends of the friction elements. When force is applied to spread the toggle and engage the friction elements with the braking surface of the drum, movement of the primary friction element actuates the lever to apply the secondary friction element. The structure of the lever is such that movement of the primary friction element causes the lever to force the heel of the primary element into drum engagement and also to force the heel of the secondary element into drum engagement with an equal distribution of the applied force.

The major object of the invention is to provide means positioned between adjacent ends of friction elements and arranged to transmit force from one element to another and to divert a portion of the applied force radially, so that the friction elements may be applied with an equal distribution of the applied force.

Other objects of the invention will appear from the following description taken in connection with the drawing, which forms a part of this specification, and in which.

Figure 1:
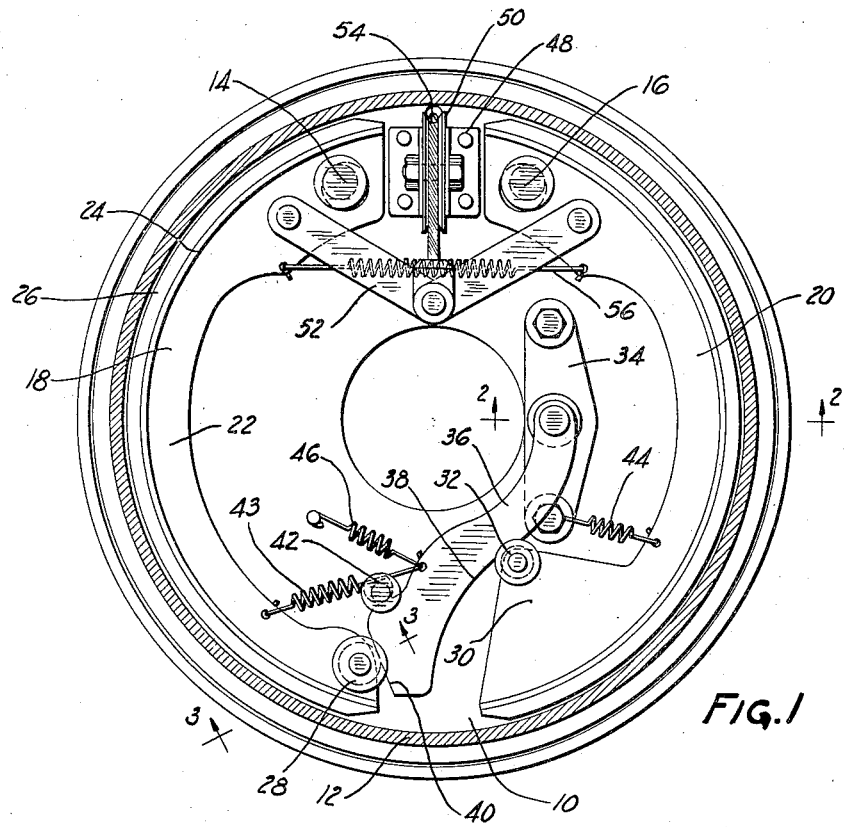
Figure 1 is a vertical sectional view of a brake taken just back of the head of the drum showing the friction elements in side elevation, and illustrating the invention as applied.
Figure 2:
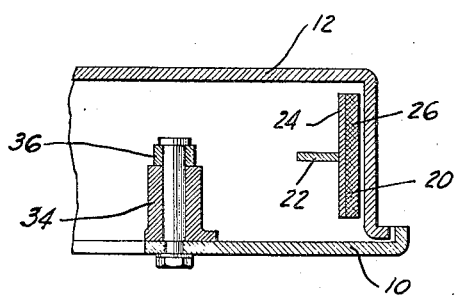
Figure 2 is a sectional view substantially on line 2—2, Figure 1.
Figure 3:
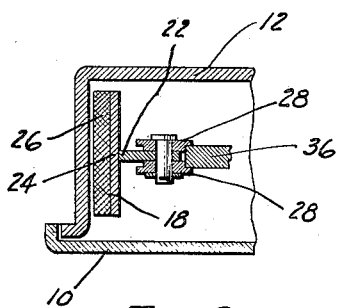
Figure 3 is a sectional view substantially on line 3—3, Figure 1.

Referring to the drawing for more specific details of the invention, 10 represents a fixed support such as a backing plate. Associated with the backing plate is a rotatable drum 12 which may be secured to a wheel, not shown, and positioned on the backing plate are suitable anchors 14 and 16. The anchors may be of any desirable structure and arrangement.

Positioned for movement on the backing plate is a primary friction element 18 and a secondary friction element 20. These elements are of the conventional type, each comprising a web 22 supporting a rim 24 to which is suitably secured a lining 26 adaptable for co-operation with the braking surface of the drum. As shown, the elements 18 and 20 are provided with suitable openings in their webs for the reception of the anchors 14 and 16. The primary element 18 has suitable mounted upon its web at the heel thereof a flanged roller 28, and the secondary element 20 has at its heel an enlarged web 30 supporting a flanged roller 32, the object of which will hereinafter appear.

Positioned on the backing plate is a bracket 34 to which is pivoted a lever 36. As shown, the lever has a curved portion 38 engaging the flanged roller 32 and the free end of the lever is provided with an inclined edge 40 engaging the flanged roller 28. Because of the flanges on the rollers 28 and 30 lateral movement of the friction elements with respect to the lever is avoided. Positioned on the backing plate in the path of the lever is an adjustable stop 42 having a head which overlies the lever. The head on the stop retains the lever against lateral movement. The rollers 28 and 32 are held in engagement with the lever 36 by a spring 43 connected between the primary friction element and the lever and a spring 44 connected between the secondary friction element and the bracket 34, and the lever 36 is held against the stop 42 by a suitable spring 46 when the brake is in the off position.

Positioned between the anchored ends of the primary friction element 18 and secondary friction element 20 is a bracket 48 supporting a pulley 50, and connected between the friction elements is a toggle 52 having connected to its knee a tension member 54 extending over the pulley and through a suitable opening in the backing plate to a source of power, not shown. The anchored ends of the shoes are also connected by a suitable return spring 56.

In operation, force is applied to the tension member 54 to spread the toggle 52. This causes the primary and secondary friction elements to be moved into drum engagement. Assuming that the drum is rotating counterclockwise, the primary friction element, upon engaging the drum, is given a slight centrifugal movement. This movement is augmented by the wiping action of the drum; and force is applied through the primary friction element and the roller 28 carried by this element to the inclined edge 40 on the lever 36. This causes the heel of the primary element to be pressed into drum engagement.

When force is applied to the lever 40, the lever transmits the force to the heel of the secondary friction element through the roller 32. Since the roller 32 travels on a curved or an arcuate edge of the lever, the heel of the secondary element is forced into drum engagement and the applied force is equally distributed between the primary and secondary elements to effectively apply these elements to the braking surface of the drum.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a pair of shoes, an anchorage and an applying device engaging one pair of shoe ends, and a generally-radial lever fulcrumed at its inner end and disconnectedly engaging one shoe at its outer end and disconnectedly engaging the other shoe between its ends.

2. A brake comprising a pair of shoes, and a generally-radial lever fulcrumed at its inner end and disconnectedly engaging one shoe at its outer end and disconnectedly engaging the other shoe between its ends.

3. A brake comprising a pair of shoes, an anchorage and an applying device engaging one pair of shoe ends, and a generally-radial lever fulcrumed at its inner end and disconnectedly engaging one shoe at its outer end and disconnectedly engaging the other shoe between its ends, together with a stop determining the position of the lever when the brake is released, and means yieldingly urging the lever toward the position determined by the stop.

4. A brake comprising a pair of shoes, and a generally-radial lever fulcrumed at its inner end and disconnectedly engaging one shoe at its outer end and disconnectedly engaging the other shoe between its ends, together with a stop determining the position of the lever when the brake is released, and means yieldingly urging the lever toward the position determined by the stop.

In testimony whereof, I have hereunto signed my name.

EUGENE V. TAYLOR.